United States Patent
Hanson

(12) 
(10) Patent No.: US 6,457,031 B1
(45) Date of Patent: Sep. 24, 2002

(54) METHOD OF MARKING PREVIOUSLY DICTATED TEXT FOR DEFERRED CORRECTION IN A SPEECH RECOGNITION PROOFREADER

(75) Inventor: Gary Robert Hanson, Palm Beach Gardens, FL (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/145,792

(22) Filed: Sep. 2, 1998

(51) Int. Cl.[7] .......................... G06F 15/00; G06F 17/00; G09B 17/04
(52) U.S. Cl. .................. 707/531; 704/235; 434/179
(58) Field of Search ............................. 704/235, 275, 704/270, 251, 240, 252, 260, 244; 707/531, 500, 501.1; 434/179

(56) References Cited

U.S. PATENT DOCUMENTS

| | | | | |
|---|---|---|---|---|
| 5,712,957 A | * | 1/1998 | Waibel et al. | 704/240 |
| 5,819,225 A | * | 10/1998 | Eastwood et al. | 704/275 |
| 5,829,000 A | * | 10/1998 | Huang et al. | 704/252 |
| 5,850,629 A | * | 12/1998 | Holm et al. | 704/260 |
| 5,855,000 A | * | 12/1998 | Waibel et al. | 704/235 |
| 5,857,099 A | * | 1/1999 | Mitchell et al. | 704/235 |
| 5,864,805 A | * | 1/1999 | Chen et al. | 704/235 |
| 5,884,258 A | * | 3/1999 | Rozak et al. | 704/251 |
| 5,899,976 A | * | 5/1999 | Rozak | 704/270 |
| 5,909,667 A | * | 6/1999 | Leontiades et al. | 704/275 |
| 5,920,836 A | * | 7/1999 | Gould et al. | 704/251 |
| 5,920,837 A | * | 7/1999 | Gould et al. | 704/251 |
| 5,950,160 A | * | 9/1999 | Rozak | 704/252 |
| 5,960,447 A | * | 9/1999 | Holt et al. | 707/500 |
| 6,064,959 A | * | 5/2000 | Young et al. | 704/251 |
| 6,098,085 A | * | 8/2000 | Blonder et al. | 707/531 |
| 6,113,394 A | * | 9/2000 | Edgar | 434/179 |
| 6,195,637 B1 | * | 2/2001 | Ballard et al. | 704/235 |
| 6,199,076 B1 | * | 3/2001 | Logan et al. | 707/501.1 |
| 6,212,498 B1 | * | 3/2001 | Sherwood et al. | 704/244 |

OTHER PUBLICATIONS

Lai, Jennifer et al., MedSpeak: report creation with continuous speech recognition, ACM conference proceedings on Human factors in computing systems, pp. 431–438, Mar. 1997.*

Proofreading Aid for Speech Dictation Systems, IBM Technical Disclosure Bullitan, vol. 39, issue 1, pp. 149–150, Jan. 1996.*

* cited by examiner

*Primary Examiner*—Joseph H. Feild
*Assistant Examiner*—William L. Bashore
(74) *Attorney, Agent, or Firm*—Akerman Senterfitt

(57) ABSTRACT

A method for marking dictated text for deferred correction or review of dictated text in a speech recognition system proofreader, comprising the steps of: displaying previously dictated text; sequentially highlighting words in the text; selectively establishing a mark for different ones of the sequentially highlighted words responsive to user commands; and, storing the marks in an ordered list, each of the marks including a current position and length of a corresponding marked word, whereby the marked words can be later recalled for correction in accordance with the ordered list. The method can, further comprise the steps of: displaying the previously dictated text in a first display window; sequentially displaying in a second display window a portion of the previously dictated text including the sequentially highlighted word; and, sequentially displaying in a third display window within the second display window the sequentially highlighted word.

4 Claims, 10 Drawing Sheets

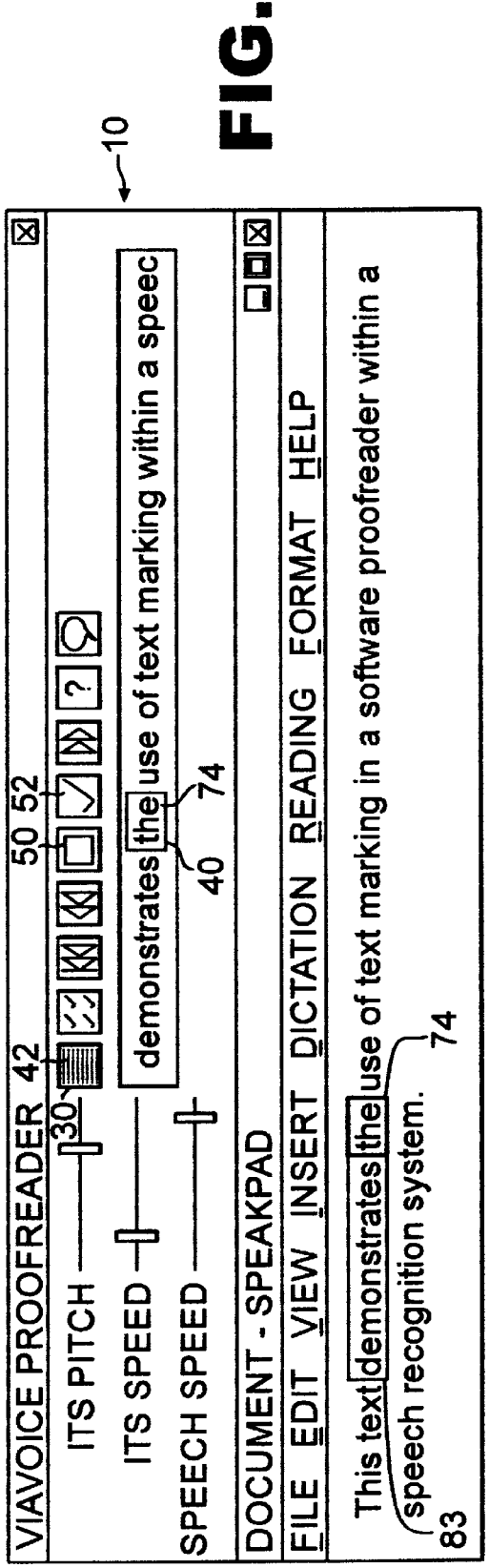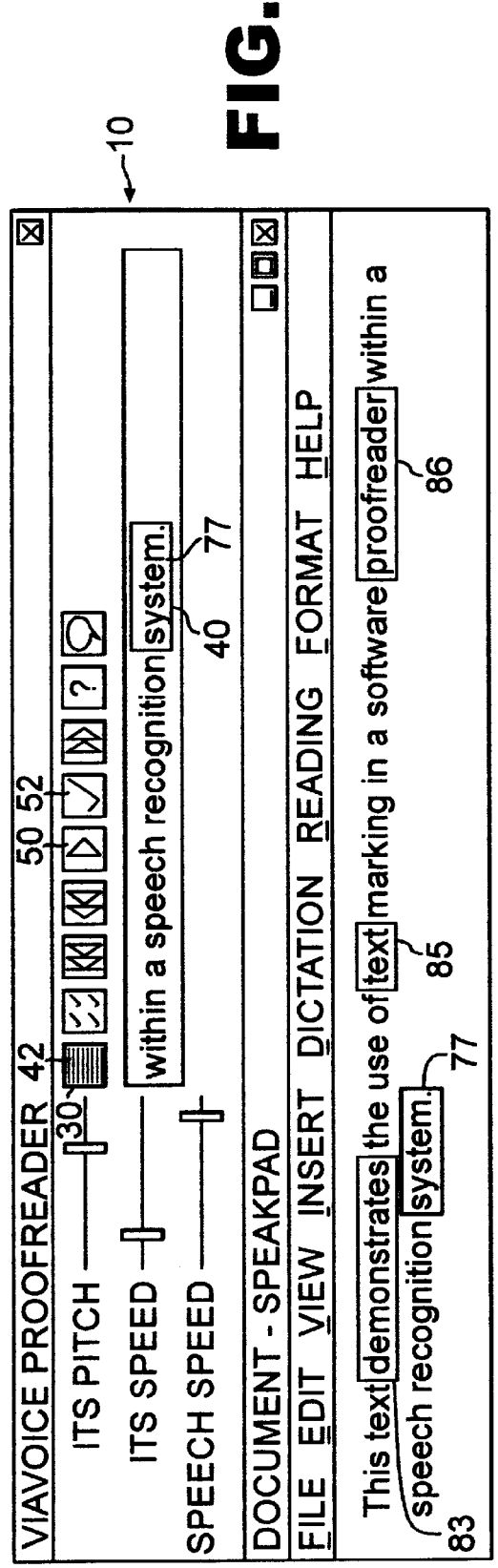
FIG. 5
FIG. 6

FIG. 9

| VIAVOICE PROOFREADER | 42 | ☒ |
|---|---|---|
| ITS PITCH —▮— 30 | 🗐 ✏ ⊗ ◁ ? ◯ | |
| ITS SPEED —▮— | | |
| SPEECH SPEED —▮— | marking in a software ⟦proofreader⟧ within a speech r | |
| | 40　76 | |

| DOCUMENT - SPEAKPAD | ☐☐☒ |
|---|---|
| FILE  EDIT  VIEW  INSERT  DICTATION  READING  FORMAT  HELP | |

This text ⟦demonstrates⟧ the use of ⟦text⟧ marking in a software ⟦proofreader⟧ within a
speech recognition system.　76
83　　85

FIG. 10

| VIAVOICE PROOFREADER | 42 | ☒ |
|---|---|---|
| ITS PITCH —▮— 30 | 🗐 ✏ ⊗ ◁ ? ◯ | |
| ITS SPEED —▮— | | |
| SPEECH SPEED —▮— | This text ⟦demonstrates⟧ the use of text marking in a s | |
| | 40　73 | |

| DOCUMENT - SPEAKPAD | ☐☐☒ |
|---|---|
| FILE  EDIT  VIEW  INSERT  DICTATION  READING  FORMAT  HELP | |

This example text demonstrates the use of ⟦text⟧ marking in a software ⟦proofreader⟧
within a speech recognition system.　83　　85　　86

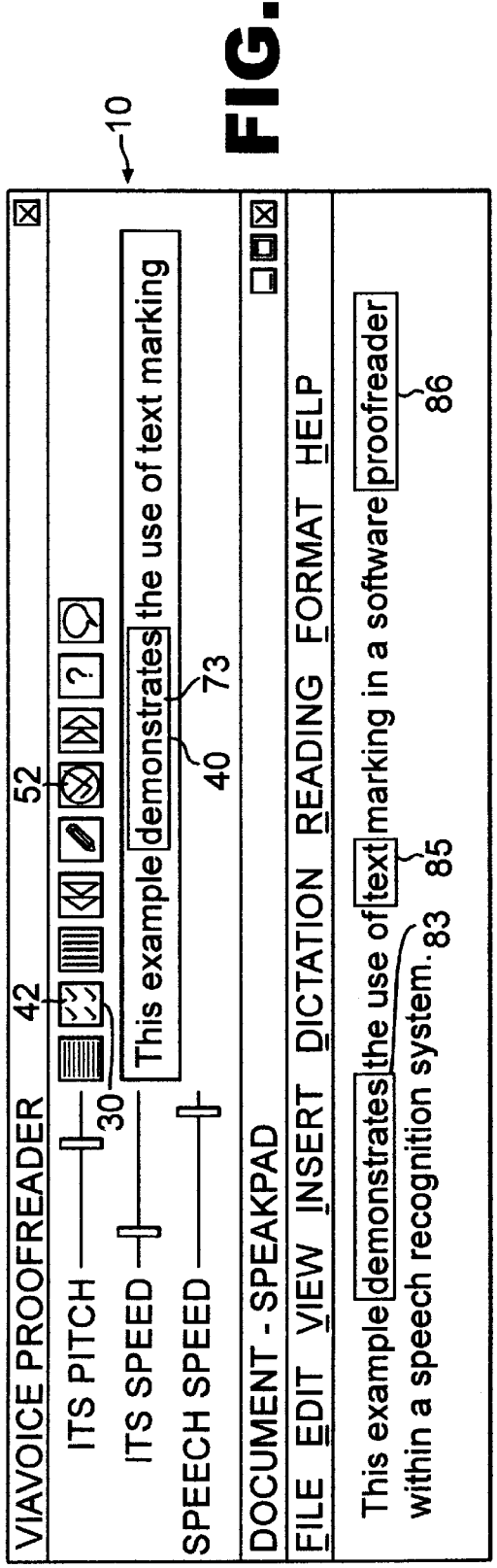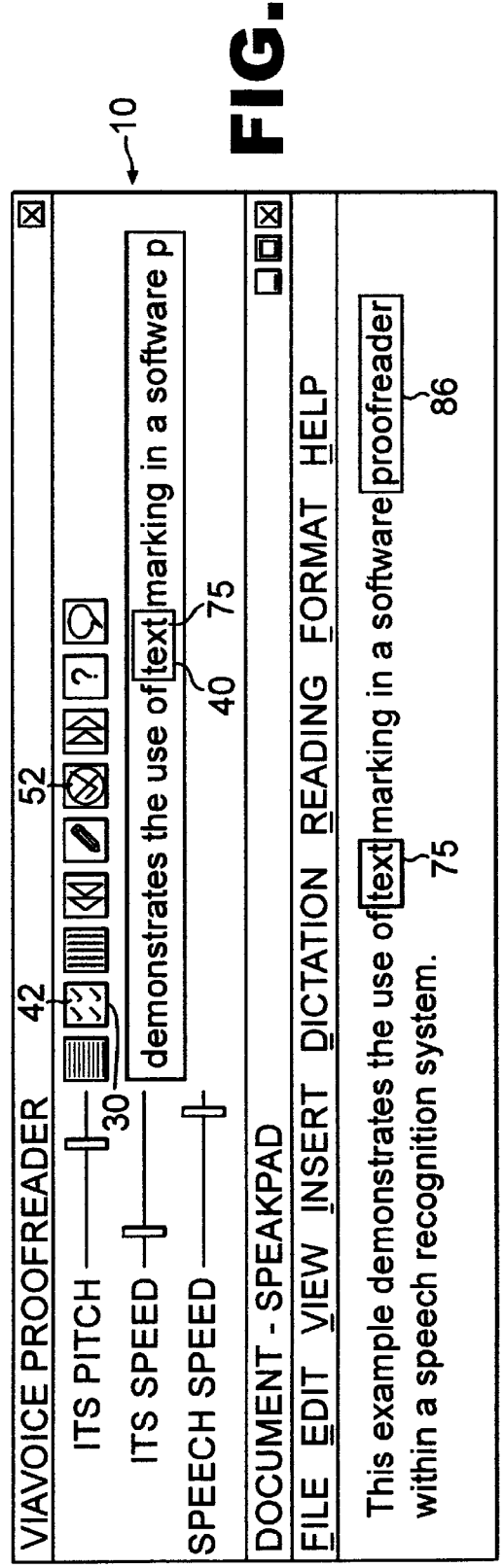

METHOD OF MARKING PREVIOUSLY DICTATED TEXT FOR DEFERRED CORRECTION IN A SPEECH RECOGNITION PROOFREADER

BACKGROUND OF THE INVENTION

1. Field of the Invention

This invention relates generally to the field of speech recognition applications, and in particular, to text marking for deferred correction or review of dictated text in a speech recognition system proofreader.

2. Description of Related Art

A proofreader in a speech recognition system plays both audio and text on a word-by-word basis to facilitate proofreading and correction of a document. As the words are played, the user has the option to halt playback and modify or otherwise correct the portions of interest. However, if numerous corrections need to be made the continual cessation and resumption of playback could quickly become tiresome and frustrating. Accordingly, a user may instead prefer to mark the dictated words for correction or review at a later time so that playback need not be interrupted. There is therefore a long-felt need for an improved method for marking text for later review and possible correction or revision.

SUMMARY OF THE INVENTION

In accordance with the inventive arrangements, a user can mark words in the document while playback continues uninterrupted, can request that marked words be highlighted in the document, can request that marked words not be highlighted in the document, can step through the marked words sequentially, jumping across intervening text, can request that a mark be automatically removed when the word is corrected, and can remove an individual mark.

A method for marking dictated text for deferred correction or review of dictated text in a speech recognition system proofreader, in accordance with the inventive arrangement, comprises the steps of: displaying previously dictated text; sequentially highlighting words in the text; selectively establishing a mark for different ones of the sequentially highlighted words responsive to user commands; and, storing the marks in an ordered list, each of the marks including a current position and length of a corresponding marked word, whereby the marked words can be later recalled for correction in accordance with the ordered list.

The method can further comprise the step of visually highlighting the marked words responsive to a user request, or the step of automatically visually highlighting the marked words.

The method can further comprise the steps of: displaying the previously dictated text in a first display window; sequentially visually highlighting each word of the previously dictated text in a first manner; and, visually highlighting each marked word in a second manner. In this characterization, the method still further comprises the steps of: sequentially displaying in a second display window portions of the previously dictated text including the word highlighted in the first manner; and, sequentially displaying in a third display window within the second display window the word in the previously dictated text highlighted in the first manner.

In a different characterization, the method can further comprise the steps of: displaying the previously dictated text in a first display window; sequentially displaying in a second display window a portion of the previously dictated text including the sequentially highlighted word; and, sequentially displaying in a third display window within the second display window the sequentially highlighted word. In accordance with this different characterization, the method still further comprises the steps of: temporarily and automatically highlighting each of the sequentially highlighted words; and, visually highlighting the selectively marked words in a different manner.

The method can further comprise the steps of: permanently visually highlighting the selectively marked words in the different manner; and, removing the permanent visual highlighting responsive to a user command. Alternatively, the method can further comprise the steps of: permanently visually highlighting the selectively marked words in the different manner; and, automatically removing the permanent visual highlighting after the marked word has been edited.

Prior to the storing step, the method can comprise the steps of, prior to the storing step: determining the current position of each marked word; and, determining the length of each marked word at each the current position.

The method can further comprise the step of recalling the marked words for correction. The marked words can be selectively played back in forward and reverse sequences corresponding to the ordered list.

The method can further comprise the steps of: examining the ordered list of marks responsive to a user request to show a mark; retrieving text associated with the mark; and, displaying the retrieved text. The displayed text can by visually highlighted.

The method can further comprise the steps of: responsive to a user modifying text by inserting, deleting or replacing characters, determining a number of characters being inserted, deleted or replaced; determining a position where the characters where the characters were inserted, deleted or replaced; if the modifying changed a marked word, adjusting the length of the marked word in the corresponding mark in the ordered list; determining if the modifying was an insertion or deletion; and, if the modifying was an insertion or deletion, adding or subtracting the number of characters to or from positions of all marks in the ordered list following a point of the insertion or deletion. The displaying of the marked words can be refreshed.

The method can further comprise the step of removing marks corresponding to modification of words corresponding to the marks. The marks can be removed automatically or can be selectively removed responsive to user commands.

BRIEF DESCRIPTION OF THE DRAWINGS

FIGS. 2–7 show an illustrative sequence of playing back and marking selected words in the text sentence.

FIGS. 8–13 show an illustrative sequence of editing or correcting the words marked in the sequence of FIGS. 2–7 in a mark view.

DETAILED DESCRIPTION OF THE PREFERRED EMBODIMENTS

Figure 1:
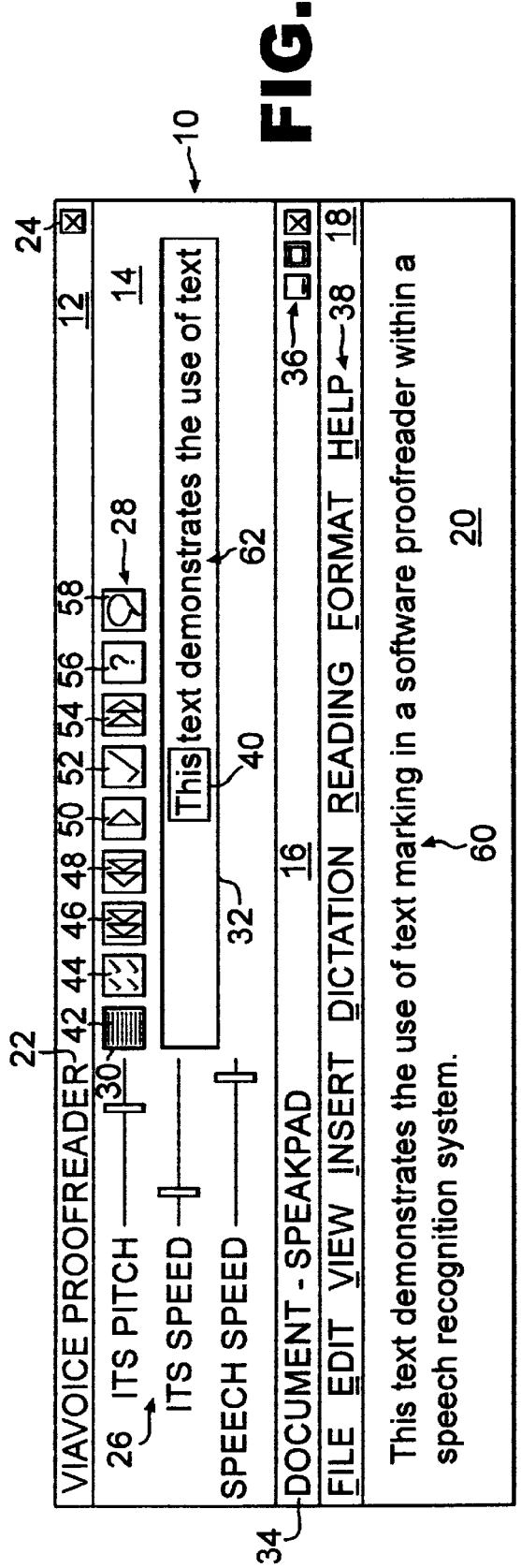
FIG. 1 is a graphical user interface (GUI) in accordance with the inventive arrangements for implementing the method for marking text during proofreading in accordance with the inventive arrangements, with a text sentence displayed for proofreading and marking in a word view.

FIG. 1 is a graphical user interface (GUI) 10 in accordance with the inventive arrangements. The GUI 10 is especially adapted for implementing the method for marking text during proofreading as taught herein. The GUI 10 comprises a plurality of display areas.

Display area 12 is a title display area for showing the name of the application, namely the ViaVoice Proofreader, and includes an activatable icon button 24 for closing the GUI 10.

Display area 14 comprises a set 26 of activatable slide bar icons and a set 28 of activatable button icons. The set of slide bar icons 26 control ITS pitch, ITS speed and SPEECH SPEED during playback. The set of button icons 28 control the proofreading process. Button 42 is activated to enter a Word View mode. In FIGS. 1–6 activation of button icon 42 and operation of the GUI 10 in the Word View mode is indicated by the rectangular border 30 surrounding button icon 42. Button icon 44 is activated to enter a Mark View mode, as is the case in FIGS. 7–13.

Button icon 46 is activated to return to the first word of a text sequence. Button icon 48 is activated to play the previous word in the word view mode and to retrieve the previous marked word in the mark view mode. Button icon 50 is activated to initiate forward playback at normal speed, similar to a play command. Button icon 52 is activated to mark a word. Button icon 54 is activated to play the next word in the word view mode and to display the next marked word in the mark view mode. Button 56 is activated to initiate a help menu. Button 58 is activated to initiate an options menu.

Display area 14 also comprises a context display window 32 and a current word, or target word, display window 40 within window 32. Current word window 40 is always centered within context window 32 and changes in width to accommodate words of different lengths as different portions 62 of a text sentence 60 are scrolled in the windows 32 and 40 during the marking process, as is clear from the sequence of FIGS. 1–13.

Display area 16 includes the name 22 of a client application indicating the sentence being proofread is from a SpeakPad dictation session. SpeakPad is an application in the IBM® ViaVoice® speech recognition product. Display area 16 also includes a set 36 of activatable button icons for minimizing, maximizing and closing the SpeakPad client.

Display area 18 includes a set 38 of activatable menu button icons for initiating commands with respect to the SpeakPad document. The set 38 includes activatable menu button icons for File, Edit, View, Insert, Dictation, Reading, Format and Help.

Figure 2:
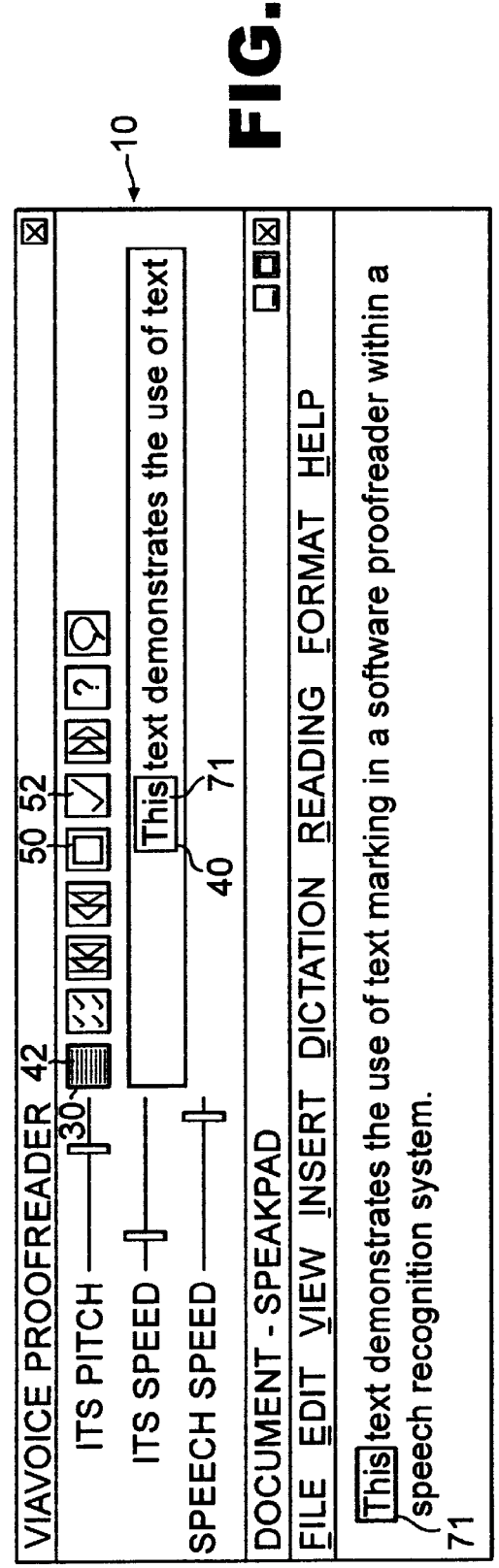
Figure 3:
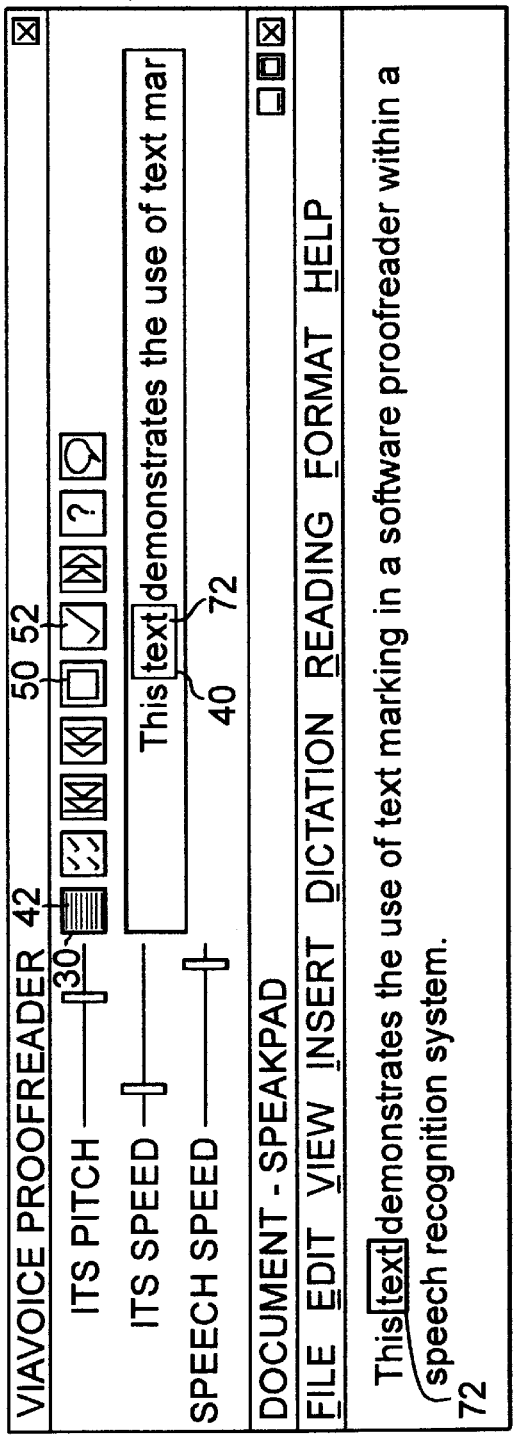
Figure 13:
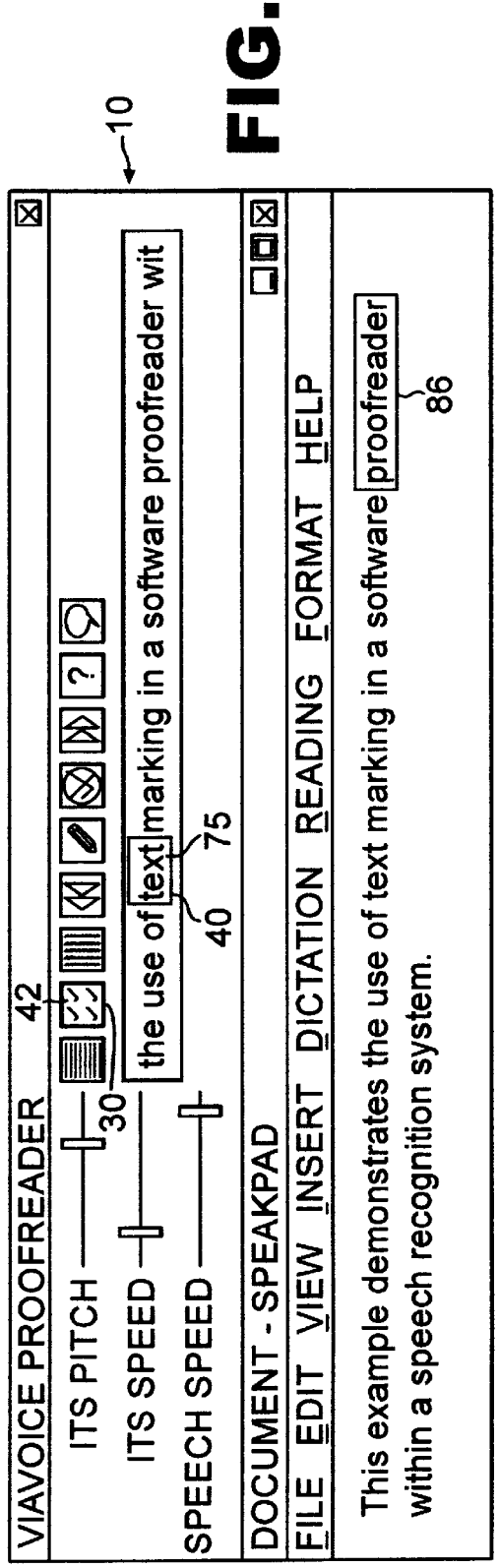

Display area 20 is for displaying the text being proofread and marked. Only one sentence 60 is displayed, but more than one sentence can be displayed at a time, depending for example on user preferences. In order to provide some order to what can be a confusing sequence of events, target words in sentence 60, which is repeated in each of FIGS. 1–12, and modified slightly in FIG. 13, are indicated by an inverse display, that is, the target word is in white letters against a black box background. Each target word is simultaneously positioned in window 40. In FIG. 1 the process has not been initiated, so that even though "This", as the first word of sentence 60, appears in window 40, "This" is not inversely displayed in window 20. Activation of the play button 50 in FIG. 1 initiates the process, and accordingly, in FIG. 2, "This" is shown with an inverse display. At the same time, the symbol on button 50 has changed to a solid square, and can be used to pause or stop the playback. To the extent that target words are pertinent to the description, each is numbered separately by reference numerals in the range of the 70's. Any time a word is marked, as explained hereinafter, the marked word is surrounded by a box. Each box is identified by a reference numeral in the range of the 80's. The "ones" digit of target words and the marking boxes are the same. For example, the word "demonstrates" in FIG. 3 is identified as a target word by reference numeral 73, and the box in FIG. 4 indicating that "demonstrates" has been marked is identified by reference numeral 83.

It should be appreciated that the sequence of events depicted in FIGS. 1–13 is illustrative of the various viewing, marking and editing options available to a user in accordance with the inventive arrangements. The scenario depicted in the sequence of FIGS. 1–13 should not be deemed to limit the scope of the inventive arrangements.

FIG. 1 shows the GUI 10 in its starting condition in the Word View mode. The proofreader controller is operating with a client application, SpeakPad. SpeakPad contains the text of a document that the user wishes to proofread. The document is represented by sentence 60 which has been retrieved for review and appears in display area 20. A portion 62 of the sentence 60 appears in context window 32. In the Word View mode the proofreader is queued to play the words upon request. The controller has displayed the first word "This" as the target word in the Current Word window 40 and subsequent text is displayed in the Context window 32.

Figure 4:
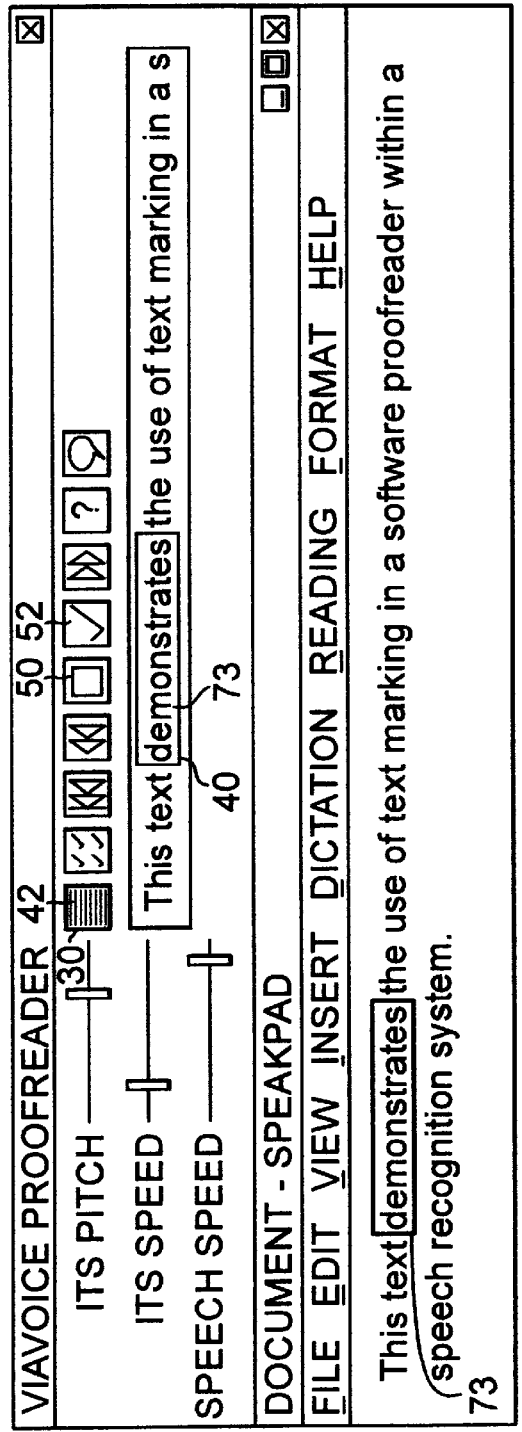

The user initiates playback by activating the Play button icon 50. FIGS. 2–5 illustrate the word-by-word playback as it appears to the user. In FIG. 2 "This" is inversely displayed as a target word 71. In FIG. 3 "text" is inversely displayed as target word 72. The portion 62 of sentence 60 has been scrolled in context window 32 so that target word 72 now appears in current word window 40. In FIG. 4 "demonstrates" is inversely displayed as target word 73 and appears in current word window 40. Activation of the mark button icon 52 in FIG. 4, or a designated key on the keyboard, results in target word 73, "demonstrates", being shown as a marked word in FIG. 5 by box or border 83. The word "the" is the target word 74 in FIG. 5 and appears in current word window 40. As the proofreader continues playback, the user has also marked the words "text" and "proofreader" with boxes or borders 85 and 86 respectively. Playback ends as shown in FIG. 6, with "system" showing as the target word 77. It can also be seen that button icon 50 has been activated to invoke the pause/stop function, as the play symbol reappears on button 50 in FIG. 6.

Figure 7:
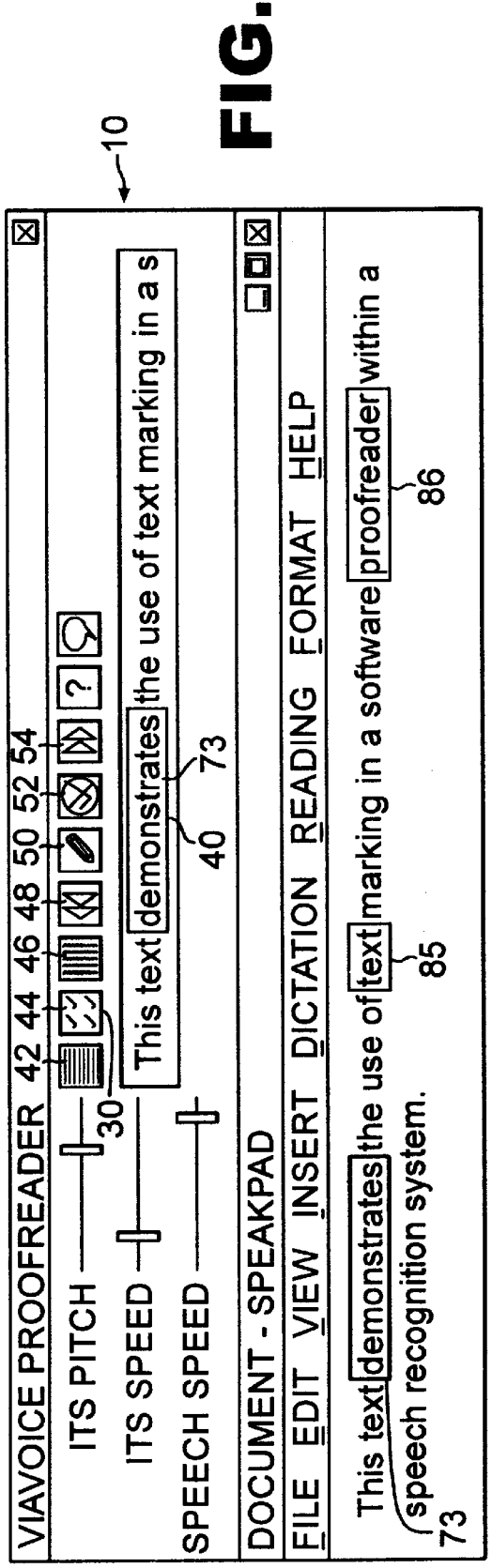
Figure 8:
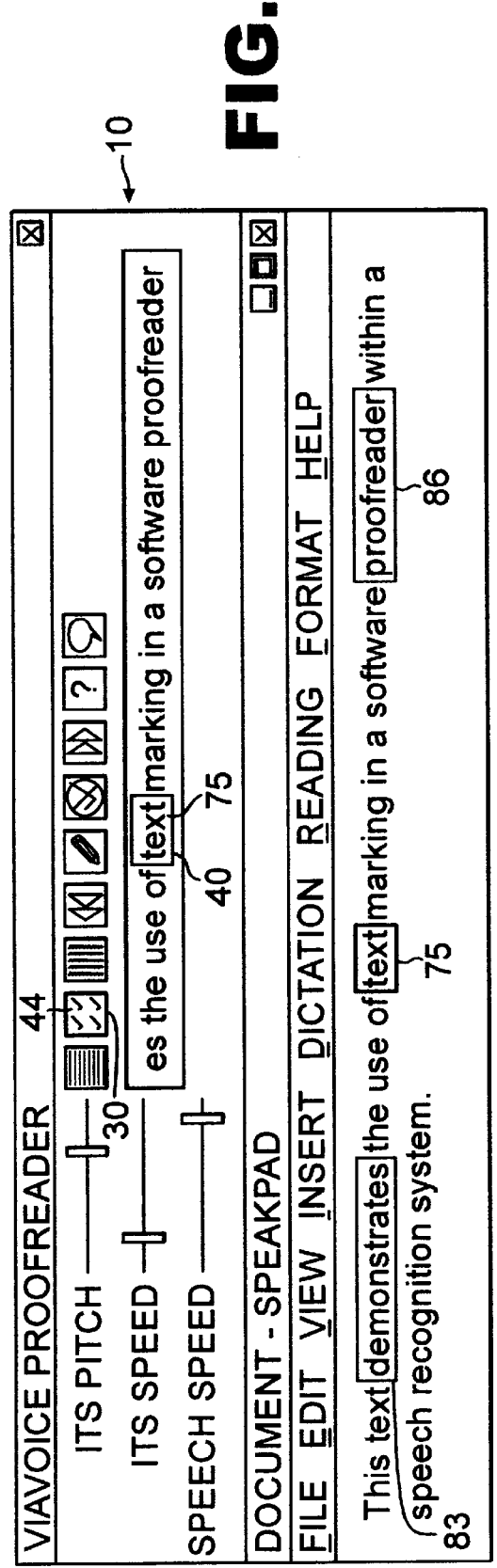

Marked words are reviewed in the Mark View mode which commences in FIG. 7 responsive to activation of button icon 44, indicated by border or box 30. When the Mark View mode is first entered the first mark is automatically selected in SpeakPad and displayed in the current word window 40 in the proofreader. The user can now move easily from mark to mark by activating the Next Mark button icon 54 and the Previous Mark button icon 48. In FIG. 8 it can be seen that button icon 46 is "greyed" indicating the function is not available in the mark view mode. Button icon 50 now shows a pencil symbol and is used to initiate an edit. Button 52 now shows a "no mark" symbol and is used to unmark a word which was previously marked.

FIG. 8 shows the result of activating the next mark button 54. The marked word 75 is inversely displayed in SpeakPad and displayed in the proofreader's current word window 40. FIG. 9 shows the result of activating the next mark button 54 again. The marked word 76 is inversely displayed in Speak-Pad and displayed in the proofreader's current word window 40.

In FIG. 10 the user has inserted the word "example" between "This" and "text". The proofreader automatically adjusts the mark positions, that is the boxes 83, 85 and 86, so that the borders or frames move with the text. The marks are also adjusted when a word is deleted. FIG. 11 shows the result of the deletion of the first occurrence of the word "text".

Although not shown, the insertion and deletion of any number of characters between marked words is handled similarly. The insertion, deletion and replacement of characters within a marked word is considered a correction of that marked word and is handled somewhat differently as explained below.

In FIG. 12 the user has elected to remove the mark for the word "demonstrates" by pressing the Unmark button 52. The proofreader removes the mark, selects the next marked word in SpeakPad and displays the next marked word in the Current Word window 40. In this case, the next marked word is "text". If there had been no subsequent marks after an unmarked word, then the preceding marked word would have been selected and displayed.

In FIG. 13 the user has changed the word "text" to "textual". Since "text" was a marked word, the proofreader sees this as a marked word correction. In this scenario, the preferred default action is to remove corrected marks, and this action is shown by the removal of the box or frame around the word "text". If the default action had been to keep the highlighting displayed, the box or frame would have been adjusted to encompass the word "textual". The two modes operate consistently for the insertion, deletion and replacement of characters within a marked word.

Figure 14:
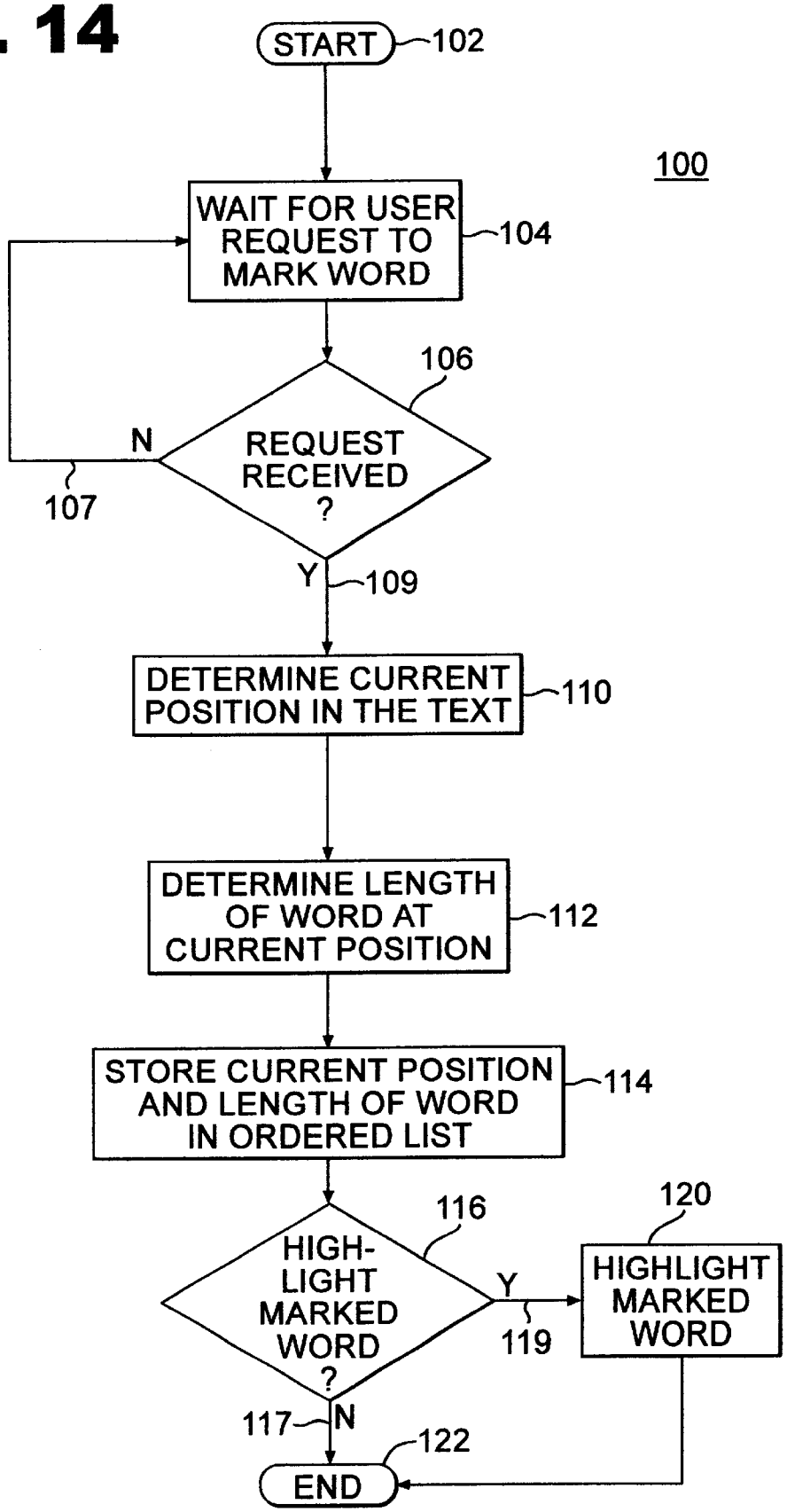
FIG. 14 is a flow chart useful for explaining how to mark individual words during playback.

FIG. 14 is a flow chart 100 useful for explaining how to mark individual words during playback. The start block 102 leads to the step of block 104, in accordance with which the proofreader waits for a request to mark a word. If no request is received in accordance with decision step 106, the method branches on path 107 and the proofreader continues waiting. If a user request to mark a word is received, the method branches on path 109 to the step of block 110.

In the step of block 110 the current position of the text is determined. In the following step of block 112 the length of the word at the current position is determined. In the following step of block 114 the current position and length of the current word is stored in an ordered list.

When the position of the word and the word's length is stored in the ordered list it is important to make sure that the mark data is inserted between any two marks whose positions bound the new mark. This ensures that the marks are always stored sequentially with respect to their positions, so that iteration through the list produces the marks in their intended order.

If the marked word is to be highlighted in response to a user request, in accordance with the step of decision block 116, the method branches on path 119 to the step of block 120, in accordance with which the marked word is highlighted. Thereafter, the process ends with the step of block 122. If the marked word is to not be highlighted, the method branches on path 117 and ends with the step of block 122.

Figure 15:
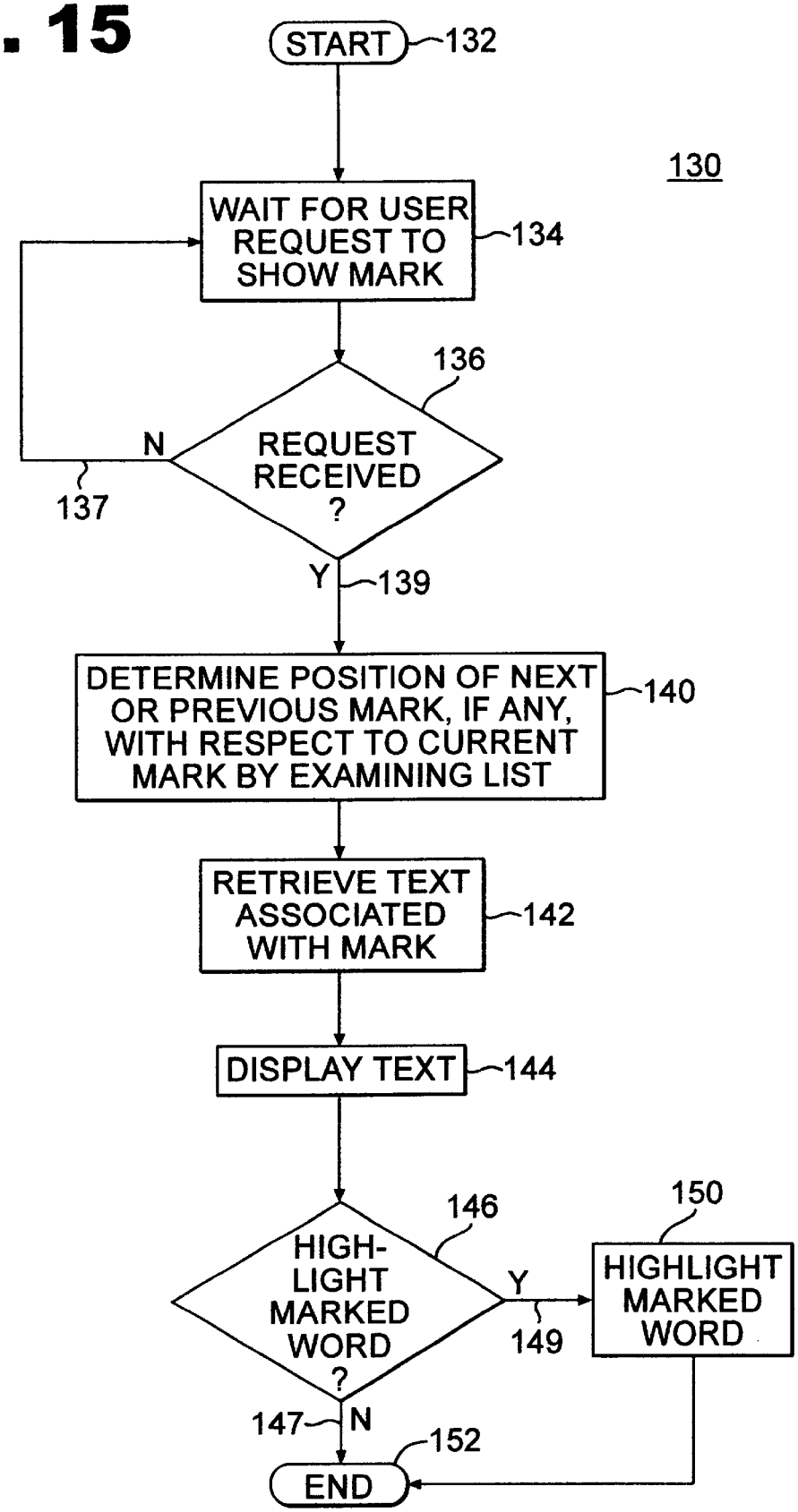
FIG. 15 is a flow chart useful for explaining how to step through the marked words one-by-one.

FIG. 15 is a flow chart 130 useful for explaining how to step through the marked words one-by-one. The start block 132 leads to the step of block 104, in accordance with which the proofreader waits for a request to show a marked word. If no request is received in accordance with decision step 136, the method branches on path 137 and the proofreader continues waiting. If a user request to show a marked word is received, the method branches on path 139 to the step of block 130.

In the step of block 140 the position of the next or previous mark, if any, with respect to the current mark, as requested by the user is determined by examining the current list as produced in accordance with the method of flow chart 100. The text associated with the next or previous mark, if any, is retrieved in accordance with the step of block 142. The retrieved text is displayed in accordance with the step of block 144.

If the marked word is to be highlighted in response to a user request, in accordance with the step of decision block 146, the method branches on path 149 to the step of block 150, in accordance with which the marked word is highlighted. Thereafter, the process ends with the step of block 152. If the marked word is to not be highlighted, the method branches on path 147 and ends with the step of block 152.

Figure 16:
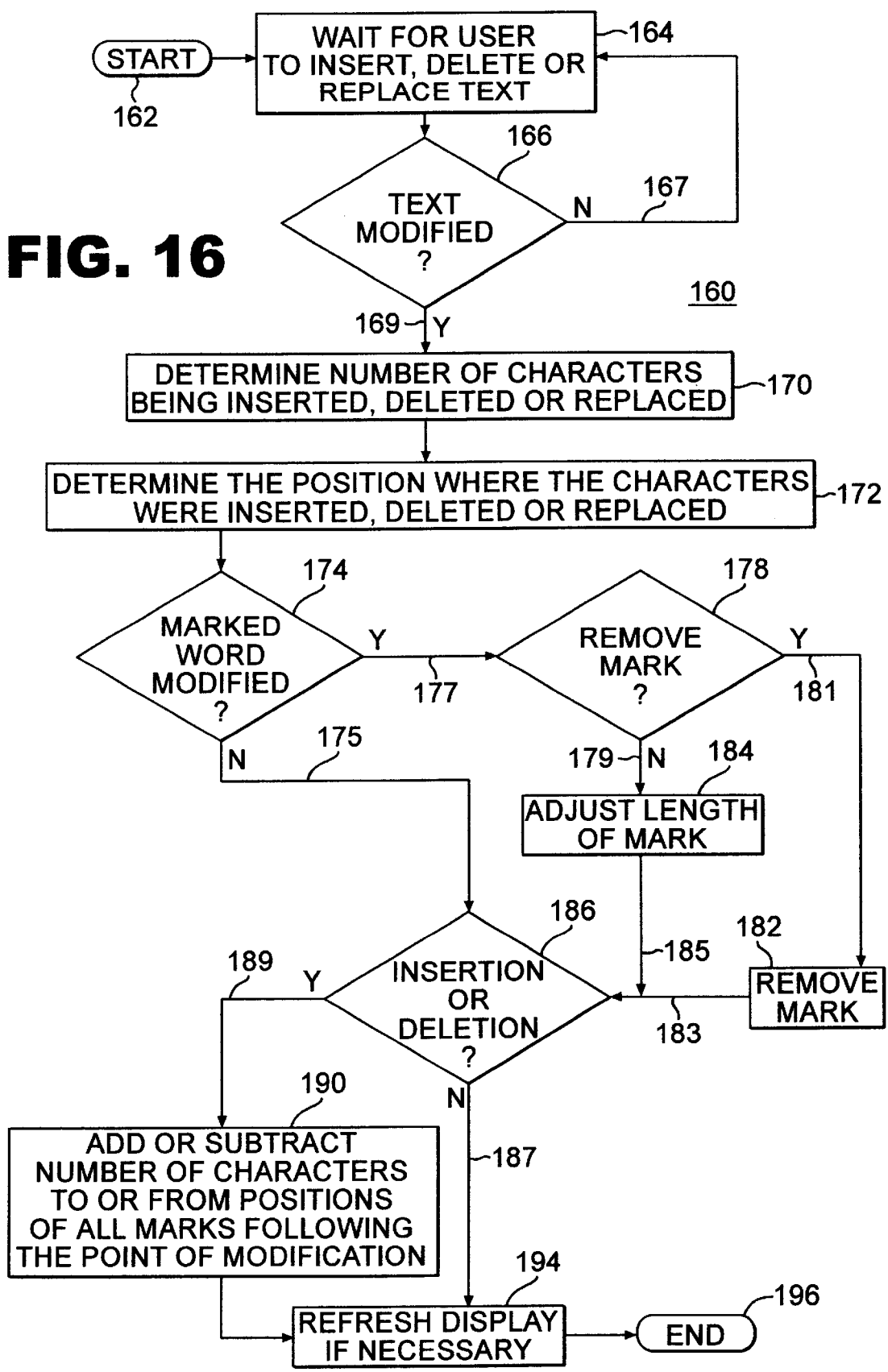
FIG. 16 is a flow chart useful for explaining how to adjust mark offsets and lengths as the text is modified.

FIG. 16 is a flow chart 160 useful for explaining how to adjust mark offsets and lengths as the text is modified. The start block 162 leads to the step of block 164, in accordance with which the proofreader waits for the user to insert, delete or replace text. If no request is received in accordance with decision step 166, the method branches on path 167 and the proofreader continues waiting. If a user request to insert, delete or replace text is received, the method branches on path 169 to the step of block 170.

In the step of block 172 the number of characters being inserted, deleted or replaced is determined. Thereafter, the position where the characters were inserted, deleted or replaced is determined.

The next determination in accordance with the step of decision block 174 is whether a marked word has been modified. If the modified word is not a marked word, the method branches on path 175 to the step of decision block 186. If the modified word is a marked word, the method branches on path 177 to the step of decision block 178 which determines if the user wants to remove the mark from the modified word. If the user does not want to remove the mark, the method branches on path 179 to the step of block 184 and the length of the mark is adjusted in the corresponding mark in the ordered list. If the user does want to remove the mark, the method branches on path 181 to the step of block 182, in accordance with which the mark is removed.

After a mark is removed, path 183 leads to decision block 186. After the length of the mark is adjusted, path 185 joins path 183 leading to decision block 186. If the modified word was not a marked word, path 175 leads to decision block 186 as noted above. Whether or not the modification was an insertion or deletion is determined in accordance with the step of decision block 186. If the modification was an insertion or deletion, the method branches on path 189 to the step of block 190, in accordance with which the number of characters is added or subtracted to or from the positions of all of the marks in the ordered list following the point of insertion or deletion. Upon completion of the step in block 190, the display of marked words is refreshed, if necessary in accordance with the step of block 194, and the method ends with the step of block 196.

If the modification was not insertion or deletion, the method branches on path 187 to block 194, in accordance with which the display of the marked words is refreshed, if necessary. The absence of an insertion or deletion is a determination that a one-for-one character replacement has occurred, which does not effect the position of any following marks in the ordered list. Thereafter, the process ends with the step of block 196.

What is claimed is:

1. A method for marking dictated text for deferred correction or review of dictated text in a speech recognition system proofreader, comprising the steps of:

displaying previously dictated text;

sequentially highlighting target words in said text during a word-by-word playback;

selectively establishing marks during said word-by-word playback for different ones of said sequentially highlighted target words responsive to user mark commands, each said mark established when said target word is highlighted;

storing said marks in an ordered list, each of said marks including a current position and length of a corresponding marked word, said ordered list containing data associated only with marked words, whereby the marked words can be later recalled for correction in accordance with said ordered list;

displaying said previously dictated text in a first display window;

sequentially visually highlighting each target word of said previously dictated text in a first manner;

visually highlighting each marked word in a second manner;

sequentially displaying in a second display window portions of said previously dictated text including target words highlighted in said first manner; and, sequentially displaying in a third display window within said second display window target words in said previously dictated text highlighted in said first manner.

2. A method for marking dictated text for deferred correction or review of dictated text in a speech recognition system proofreader, comprising the steps of:

displaying previously dictated text;

sequentially highlighting target words in said text during a word-by-word playback;

selectively establishing marks during said word-by-word playback for different ones of said sequentially highlighted target words responsive to user mark commands, each said mark established when said target word is highlighted;

storing said marks in an ordered list, each of said marks including a current position and length of a corresponding marked word, said ordered list containing data associated only with marked words, whereby the marked words can be later recalled for correction in accordance with said ordered list;

displaying said previously dictated text in a first display window;

sequentially displaying in a second display window a portion of said previously dictated text including said sequentially highlighted target word;

sequentially displaying in a third display window within said second display window said sequentially highlighted target word;

temporarily and automatically highlighting each of said sequentially highlighted target words; and, visually highlighting said selectively marked words in a different manner.

3. The method of claim 2, further comprising the steps of:

permanent visually highlighting said selectively marked words in said different manner responsive to a first user command; and, removing said permanent visual highlighting responsive to a second user command.

4. The method of claim 2, further comprising the steps of:

permanent visually highlighting said selectively marked words in said different manner responsive to a user command; and, automatically removing said permanent visual highlighting after said marked word has been edited.

* * * * *